United States Patent [19]

Hanson

[11] Patent Number: 4,694,437

[45] Date of Patent: * Sep. 15, 1987

[54] SUBTERRANEAN SURVEYING APPARATUS

[76] Inventor: Lowell C. Hanson, P.O. Box 299, Helena, Mont. 59624

[ * ] Notice: The portion of the term of this patent subsequent to Jul. 30, 2002 has been disclaimed.

[21] Appl. No.: 759,261

[22] Filed: Jul. 26, 1985

Related U.S. Application Data

[63] Continuation-in-part of Ser. No. 527,100, Aug. 29, 1983, Pat. No. 4,532,545.

[51] Int. Cl.$^4$ .............................................. G01V 1/00
[52] U.S. Cl. ...................................... 367/27; 367/25; 367/911; 181/104; 175/40
[58] Field of Search .................... 367/25, 27, 28, 99, 367/104, 911; 181/101, 102, 104, 105; 340/853, 856; 175/40, 45; 166/250; 299/1

[56] References Cited

U.S. PATENT DOCUMENTS

| | | | |
|---|---|---|---|
| 3,364,464 | 1/1968 | Dellinger | 340/853 |
| 3,961,683 | 6/1976 | Delignieres | 367/27 X |
| 4,532,545 | 7/1985 | Hanson | 358/100 |

Primary Examiner—Charles T. Jordan
Assistant Examiner—John W. Eldred
Attorney, Agent, or Firm—Arthur L. Urban

[57] ABSTRACT

Subterranean surveying apparatus includes a support portion, a connector portion, a housing portion, a positioning portion, a monitoring portion and a control portion. The support portion includes a horizontal reference surface and a base section extending downwardly from the reference surface with mechanism for leveling the reference surface. The connector portion includes a torsionally rigid mast assembly suspended from the reference surface and extending downwardly therefrom with mechanism for selectively fixing the position of the mast assembly with respect to the reference surface. The mast assembly includes a plurality of elongated members disposed in an end to end relationship, the elongated members including end sections securable to adjoining ends of other elongated members. The housing portion includes an elongated hollow section, the upper end of which is affixed to the lower end of the mast assembly. At least one opening in the hollow section is intermediate the ends thereof. A signal emitting device is disposed within the hollow section adjacent the opening. The positioning portion includes lifting mechanism mounted on the support portion base section and connected to the housing portion. The monitoring portion includes a signal display located adjacent to the support portion. Indexing mechanism is disposed adjacent to the reference surface and connected to the upper end of the mast assembly for determining the orientation of the signal emitting device. The control portion includes controls for the signal emitting device and a power source for the apparatus.

18 Claims, 4 Drawing Figures

SUBTERRANEAN SURVEYING APPARATUS

This application is a continuation-in-part of pending application Ser. No. 527,100, filed Aug. 29, 1983 now U.S. Pat. No. 4,532,545.

This invention relates to a novel surveying apparatus and more particularly relates to a new apparatus for surveying subterranean areas.

Throughout history, man has removed a wide variety of different materials from the ground. These materials have included metals, minerals, ores thereof and the like. Originally, such materials were removed simply by excavating into the ground to the depth required to reveal the desired materials. Where the materials were located a considerable distance below the surface, the materials might be mined through the use of subterranean tunnels.

Centuries ago, these excavations had to be done by hand with simple tools. More recently, special machinery has been developed to perform these tasks. With the development of such machinery, it was possible to tunnel great distances both in depth and horizontally once the deposits of the desired materials were located.

After the deposits of the materials had been removed, the mines were abandoned and now mine sites were explored. This sequence was repeated again and again as each site was exhausted. Over the centuries, many mines have been worked and then abandoned.

In the past, little attention was directed toward properly marking the location of a mine or making a survey of the underground passages. In addition, records frequently were not kept on these matters. Years ago, miners could be found who remembered facts about the mines because they worked there. As time passed, these persons moved away or died, until today it frequently is impossible to obtain any reliable information on certain abandoned mines even with diligent searching.

As time passed, various surface improvements have been made over mines or are planned for the future. Highways pass over mine sites and buildings or other structures are located on the sites. Although the tunnels and caverns of some mines are still in good condition, other mines already have collapsed and many present inherent dangers of collapse.

Collapse of mine tunnels can drastically change the surface terrain. While these changes in topography may not be serious on undeveloped land, if the land has been developed or is about to be developed, the consequences of subterranean instability can be disastrous. Buildings and highways constructed over unstable mines can be damaged or destroyed in the event of a collapse. Not only is repair of such damage very costly, but also there may be injury or death to persons who are in the buildings or traveling on the highways in the event of a collapse.

The recent increase in the value of minerals and particularly fuel sources has changed the perspective as to what constitutes an economically feasible mine site. Another factor is the development of new mining machinery and techniques. In view of these changes, mines that formerly were considered to be exhausted now are being reconsidered for further production.

Before deciding if an abandoned mine is an economically feasible proposition, it is necessary to obtain an accurate estimate of the cost of reopening the mine. Such an estimate is practically impossible to make unless the exact layout of the mine and its present condition can be established.

Because of the hazardous condition of many abandoned mine tunnels, actual physical inspection of the tunnels is impossible. Thus, it is necessary to obtain the required information indirectly from the surface. Some information about the mine can be obtained by drilling holes in an attempt to intercept the tunnels. Deciding where to drill the test holes generally is strictly a trial and error operation and can consume substantial amounts of time and money.

The use of a camera, either photographic or video, also has been tried. Although such expedients allow subterranean inspection, a great deal of interpretation and guesswork is required to gain even a rough idea of the mine layout and condition.

From the above, it is clear that past and present methods of subterranean exploration do not provide a reliable basis for making decisions on the layout and condition of abandoned mines. Thus, there is an urgent need for a new and improved method and apparatus which overcomes the shortcomings and deficiencies of previous methods and equipment. This is true especially in view of the increasing interest and participation of state and federal governments in the stabilization of subterranean areas.

The present invention provides a novel apparatus for surveying subterranean areas quickly and conveniently. With the apparatus of the invention, the surveying of subterranean tunnels and chambers, even those that are flooded, can be accomplished with much improved accuracy. Such surveys can be performed by a single operator.

The surveying apparatus of the present invention is simple in design and can be produced relatively inexpensively. The apparatus can be fabricated from commercially available materials and components. Conventional industrial manufacturing techniques and procedures and semi-skilled labor can be utilized in its manufacture.

The surveying apparatus can be installed at a mine site conveniently in a short period of time by semi-skilled labor. The apparatus can be used efficiently by surveyors and other persons with similar background and training after only a minimum of instruction.

The surveying apparatus is durable in construction and has a long useful life even under the conditions normally encountered in the field. Little, if any maintenance is required to keep the apparatus in working condition. The apparatus can be adapted easily to meet particular mine sites and conditions.

These and other benefits and advantages of the novel subterranean surveying apparatus of the present invention will be apparent from the following description and the accompanying drawings in which.

Figure 1:
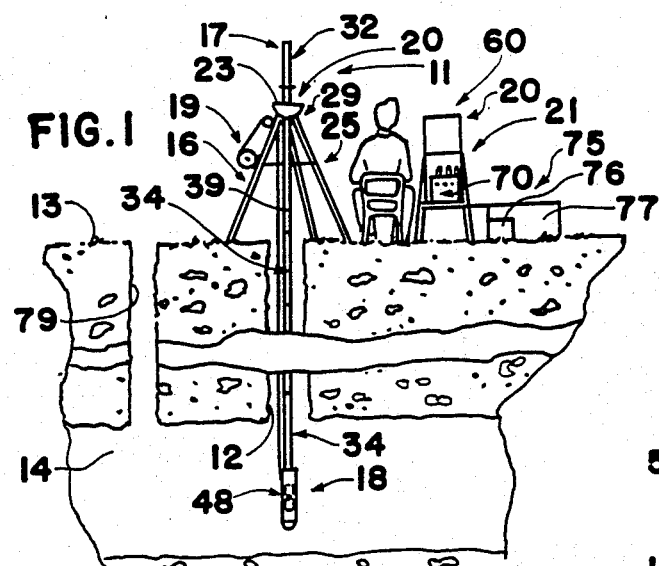
FIG. 1 is a schematic illustration of the apparatus of the invention in use in the surveying of a subterranean chamber.

As shown in the drawings, one form of the novel surveying apparatus 11 of the present invention is mounted over a borehole 12 in the ground 13. The bore 12 extends downwardly through the ground to a subterranean chamber 14.

The surveying apparatus 11 of the invention includes a support portion 16, a connector portion 17, a housing portion 18, a positioning portion 19, a monitoring portion 20 and a control portion 21.

The support portion 16 of the surveying apparatus 11 of the invention includes a horizontal reference surface 23. Advantageously, the reference surface 23 is a plate member with a central opening 24. The support portion also includes a base section 25 that extends downwardly from the reference surface 23. The base section 25 preferably includes a tripod section 27.

Figure 2:
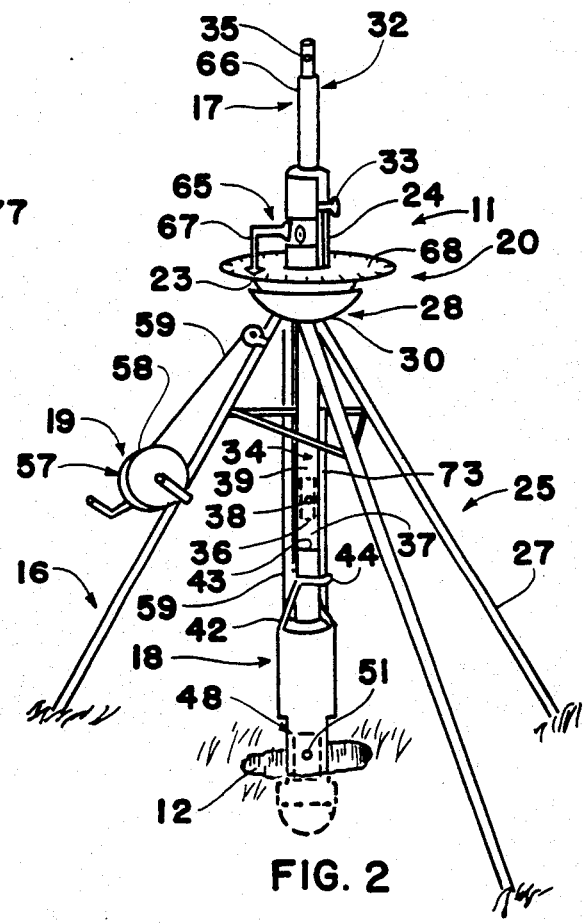
FIG. 2 is an enlarged view in perspective of another form of surveying apparatus preparatory to installation in a subterranean chamber.

Means 28 are provided for leveling the reference surface 23. The leveling means 28 advantageously includes a pivotal connection 29 between the reference surface 23 and the base section 25 as shown in FIG. 1. Alternatively, the leveling means may include a ball and socket connection 30 as shown in FIG. 2 between the reference surface 23 and the base section 25.

The connector portion 17 of the surveying apparatus 11 includes a torsionally rigid mast assembly 32. The mast assembly 32 is suspended from the reference surface 23 and extends downwardly therefrom. Means such as clamp 33 are provided for selectively fixing the position of the mast assembly with respect to the reference surface.

Figure 3:
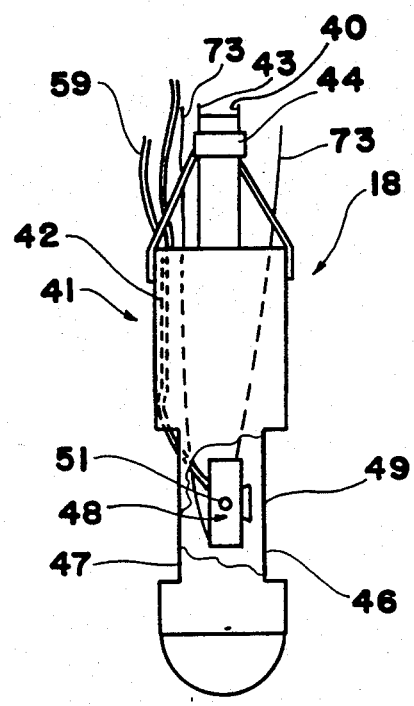
FIG. 3 is an enlarged side view in section of the instrument housing portion of the surveying apparatus shown in FIG. 1.
Figure 4:
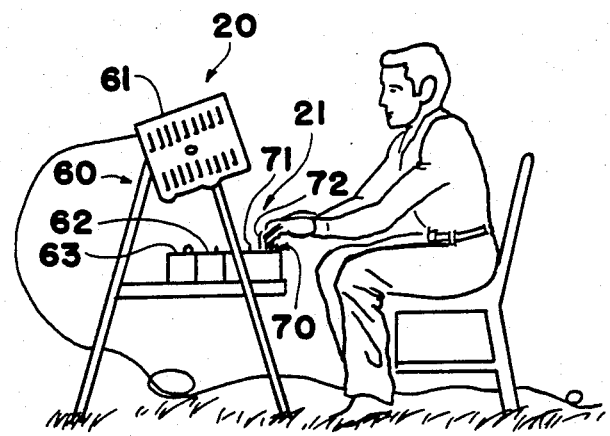
FIG. 4 is a side view of the instrument monitoring portion of the surveying apparatus shown in FIG. 1.

The mast assembly 32 includes a plurality of elongated members 34. The elongated members 34 are joined in an end to end relationship. The elongated members include end sections 35 and 36 that are securable to the adjoining ends 37 of other elongated members. Advantageously, one of the end sections may be a male end 35 and the adjoining end may be a female fitting 36. Fastening means such as a pin 38 or set screw preferably is utilised to secure the connection. The elongated members 34 may be rod sections 39 (FIG. 1) or more advantageously tubular sections 40 as shown in FIG. 3.

The housing portion 18 of the surveying apparatus 11 includes an elongated hollow section 41. The upper end 42 of the hollow section 41 is affixed to the lower end 43 of the mast assembly 32. This connection preferably is through a suitable mounting bracket 44.

The hollow section 41 includes at least one operating 46 therein intermediate the ends of the section. If desired, the hollow section may include a pair of longitudinally elongated openings 46 and 47. A signal emitting device 48 is disposed within the hollow section 41 adjacent the opening 49.

The signal emitting device 48 advantageously emits a sound pulse such as sonar, radar, ultrasound and similar devices. The signal preferably is emitted from a transducer 49 in a narrow cone and reflects back to the transducer from objects in its path. Thus, the same transducer may be used to transmit and receive the sound energy.

The mounting of the signal emitter 48 is such that the functional end thereof is directed toward the area being surveyed. This orientation can be achieved by a fixed transverse mounting or by securing the signal emitter 48 pivotally on a horizontal shaft 51. This arrangement enables the signal emitter to be tilted upward or downward slightly to focus on a particular feature in the chamber. Such a construction also allows the emitter to be disposed along the axis of the housing portion 18 while the housing portion is being lowered to the subterranean chamber and subsequently be pivoted to a horizontal position with the end of the emitter extending through the opening 43 and pointed in the desired direction.

The positioning portion 19 of the surveying apparatus 11 includes lifting means 57. The lifting means 57 shown as a winch 58 is mounted on the base section 25 of the support portion 16. The lifting means 57 is connected to the housing portion 18. This may be accomplished preferably through a cable 59, the free end of which is connected to mounting bracket 44.

The monitoring portion 20 of the surveying apparatus 11 of the present invention includes signal display means 60. The signal display means 60 is located adjacent to the support portion 16. Advantageously, the display is located so that it is convenient for observation by an operator stationed at the base section 25. The signal display means 60 may include a recorder 61, a computer programmer 62, a plotter 63, other similar devices and combinations thereof.

The monitoring portion 20 also includes indexing means 65 disposed adjacent to the reference surface 23. The indexing means 65 is connected to the upper end 66 of the mast assembly 32. Advantageously, the indexing means 65 includes mast aligning means such as pointer 67 that is affixed to the upper end of the mast assembly. To facilitate orientation of the pointer 67, it is preferable to include a circular scale element 68 on the reference surface 23. Pointer 67 is aligned with emitter 48.

The control portion 21 of the surveying apparatus 11 includes control means for the signal emitting device 48. The control means may be housed in a panel 70 that includes switches 71, adjustable knobs 72 or other actuators. The switches and knobs control the operation of the signal emitter 48.

The control portion 21 also may include means for tilting the emitter 48 such as cables 73. Similarly if the lifting means 57 or tilting means 73 include motor drives, switches can control the operation of the drive units (not shown).

Instruments such as the signal emitter 48 and display 60 as well as other electrical systems are powered through a source 75. This power source 15 may be an electrical supply line or more probably a battery 76 and/or a portable generator 77.

In the use of the novel surveying apparatus 11 of the present invention, the support portion 16 is positioned over a borehole 12 in the ground 13. The legs of tripod section 27 are positioned around the borehole to provide a generally horizontal disposition of the reference surface 23. Adjustment of the reference surface more accurately can be made by changing the length or angle of one or more of the legs. Alternatively, with the ball and socket connection 30 of FIG. 2, the connection can be adjusted without changing the legs by moving the ball with respect to the socket.

After leveling the reference surface 23, a first elongated member 34 is passed through opening 24 and the lower end thereof secured to the mounting bracket 44 of housing portion 18. Also, the free end of cable 59 is connected to the mounting bracket. The housing portion 18 with a signal emitting device 48 is lowered into the borehole by releasing cable 59 from winch 58. As the upper end of this elongated member 34 reaches the reference surface 23, another elongated member is affixed thereto and the housing portion is lowered further into the borehole. This sequence is repeated with the addition of another member 34 to the mast assembly 32 and the lowering of the housing 18 continued.

When the housing portion 18 contacts the bottom of the borehole 12, it is withdrawn slightly and the position of the housing fixed. This is accomplished by securing the upper end 66 of the mast assembly 32 to the reference surface 23 such as with suitable clamping means 33. Also, scale 68 is placed over the reference surface 23.

The tension in cable 59 is released so the housing portion in the bottom of the borehole 12 is suspended entirely from mast assembly 32. Mast aligning pointer 67 is positioned over the upper end of the mast assembly and affixed thereof. The signal display 60 as well as control panel 70 and power source 75 are set up adjacent to the support portion. The necessary electrical connections are made, and the apparatus 11 is ready for use.

An operator positions himself close to the apparatus and activates the various components of the apparatus thereof. The control panel 70 activates the signal emitter 42 in the borehole. Also, the emitter is pivoted, if necessary, into position with cables 73. Next, the mast assembly 32 is rotated slowly either manually or with a drive unit (not shown), while the operator observes the display 60. When he observes a representation of a tunnel, chamber or other subterranean feature, he can stop the rotation of the mast assembly. Also, the emitter 48 in the borehole may be tilted upward or downward slightly to obtain the best view of the area.

The position of the pointer 67 on the upper end of the mast assembly can be noted with respect to scale 68 to establish the direction of the emitter 48 for the later preparation of a map of the area being surveyed. Also, the direction of the pointer 67 can be sighted along the surface visually and a stake or other identifying mark placed to provide a surface representation of the subterranean features.

When observation of the feature within the view of the emitter is completed, the operator can rotate the mast assembly 32 further until another subterranean feature extending in another direction comes into view. At that time, the necessary adjustment of the controls can be made and the observation of the feature begun. This sequence can be repeated until all of the features observable from that location have been noted.

The apparatus 11 then may be moved to another borehole. The selection of the next borehole can be done quickly and accurately through the information that has been obtained from the initial position. The next borehole 79 can be drilled while the emitter 48 still is observing the area so the exact location thereof as the drill breaks into view can be noted as it is occurring.

The above description and the accompanying drawings show that the present invention provides a novel apparatus for surveying subterranean features, even those that are flooded. An entire subterranean mine can be surveyed, with the apparatus providing reliable and accurate information on which decisions regarding a mine can be made with confidence.

The surveying apparatus of the invention can be used efficiently by surveyors and others with similar experience after only a minimum of instruction. The apparatus can be adapted to meet particular surveying conditions. The surveying can be conducted by a single operator with the apparatus of the invention. Also, surface representations of the location of the underground features can be created.

The surveying apparatus is simple in design and relatively inexpensive. The apparatus can be fabricated from commercially available materials and components using conventional assembly techniques and procedures. The apparatus has a long useful life and requires only a minimum of maintenance.

It will be apparent that various modifications can be made in the particular surveying apparatus described in detail and shown in the drawings within the scope of the invention. The size, configuration and arrangement of components can be changed to meet specific requirements and objectives. Different types of lifting and operating mechanisms can be employed. Also, the mast assembly may be constructed and lowered into the borehole in a different manner.

In addition, the apparatus of the invention may be employed with other devices such as video or photographic cameras, if desired. These and other changes can be made in the surveying apparatus of the invention provided the functioning and operation thereof are not adversely affected. Therefore, the scope of the present invention is to be limited only by the following claims.

What is claimed is:

1. Subterranean surveying apparatus including a support portion, a connector portion, a housing portion, a positioning portion, a monitoring portion and a control portion; said support portion including a horizontal reference surface, a base section extending downwardly from said reference surface, means for leveling said reference surface; said connector portion including a torsionally rigid mast assembly, said mast assembly being suspended from said reference surface and extending downwardly therefrom, means for selectively fixing the position of said mast assembly with respect to said reference surface, said mast assembly including a plurality of elongated members disposed in an end to end relationship, said elongated members including end sections securable to adjoining ends of other elongated members; said housing portion including an elongated hollow section, the upper end of said hollow section being affixed to the lower end of said mast assembly, at least one opening in said hollow section intermediate the ends thereof, a signal emitting device disposed within said hollow section adjacent said opening; said positioning portion including lifting means mounted on said support portion base section, said lifting means being connected to said housing portion; said monitoring portion including signal display means located adjacent to said support portion, indexing means disposed adjacent to said reference surface, said indexing means being connected to the upper end of said mast assembly for determining the orientation of said signal emitting device; said control portion including control means for said signal emitting device, and a power source for said apparatus; whereby said support portion can be set up over a ground borehole, said housing portion lowered into said borehole and an operator can survey the bottom of said borehole while positioned on the surface adjacent to said apparatus.

2. Subterranean surveying apparatus according to claim 1 wherein said reference surface is a plate member.

3. Subterranean surveying apparatus according to claim 1 wherein said base section of said support portion includes a tripod section.

4. Subterranean surveying apparatus according to claim 1 wherein said leveling means includes a pivotal connection between said reference surface and said base section.

5. Subterranean surveying apparatus according to claim 1 wherein said leveling means includes a ball and socket connection between said reference surface and said base section.

6. Subterranean surveying apparatus according to claim 1 wherein said elongated members of said mast assembly include tubular sections.

7. Subterranean surveying apparatus according to claim 1 wherein said end sections of said elongated members include fastening means.

8. Subterranean surveying apparatus according to claim 1 wherein said openings in said hollow section include a pair of longitudinally elongated openings.

9. Subterranean surveying apparatus according to claim 1 wherein said lifting means of said instrument positioning portion includes winch means.

10. Subterranean surveying apparatus according to claim 1 wherein said signal emitting device is pivotable about a horizontal shaft.

11. Subterranean surveying apparatus according to claim 1 wherein said signal emitting device utilizes sonar.

12. Subterranean surveying apparatus according to claim 1 wherein said signal emitting device utilizes radar.

13. Subterranean surveying apparatus according to claim 1 wherein said signal emitting device utilizes ultrasound.

14. Subterranean surveying apparatus according to claim 1 wherein said monitoring portion includes recording means.

15. Subterranean surveying apparatus according to claim 1 wherein said monitoring portion includes computer programming means.

16. Subterranean surveying apparatus according to claim 1 wherein said indexing means includes mast aligning means.

17. Subterranean surveying apparatus according to claim 1 wherein said monitoring portion includes a circular scale element adjacent said reference surface and functioning cooperatively with said indexing means.

18. Subterranean surveying apparatus according to claim 1 wherein said power source includes a portable generator.

* * * * *